(12) United States Patent
Vadapalli et al.

(10) Patent No.: US 8,477,846 B2
(45) Date of Patent: Jul. 2, 2013

(54) SYSTEM AND METHOD FOR ADAPTIVE INTRA REFRESH RATE SETTING IN A VIDEO ENCODER

(75) Inventors: Sarat Chandra Vadapalli, Hyderabad (IN); Biswadeep Sengupta, Bangalore (IN); Sriram Sethuraman, Bangalore (IN)

(73) Assignee: Ittiam Systems (P) Ltd., Bangalore, Karnataka (IN)

( * ) Notice: Subject to any disclaimer, the term of this patent is extended or adjusted under 35 U.S.C. 154(b) by 733 days.

(21) Appl. No.: 12/574,715

(22) Filed: Oct. 7, 2009

(65) Prior Publication Data
US 2011/0080952 A1    Apr. 7, 2011

(51) Int. Cl.
*H04N 7/12* (2006.01)
*H04N 11/04* (2006.01)

(52) U.S. Cl.
USPC ............. 375/240.15; 375/240.24; 375/240.12

(58) Field of Classification Search
USPC .......................... 375/240.15, 240.12, 240.24
See application file for complete search history.

(56) References Cited

U.S. PATENT DOCUMENTS

| | | | |
|---|---|---|---|
| 7,106,907 B2 * | 9/2006 | Lin et al. | 382/236 |
| 7,110,450 B1 * | 9/2006 | Kimoto | 375/240 |
| 7,349,472 B2 * | 3/2008 | Vetro et al. | 375/240.03 |
| 8,010,139 B2 * | 8/2011 | Yu et al. | 455/509 |
| 2006/0078051 A1 * | 4/2006 | Liang et al. | 375/240.24 |
| 2008/0089414 A1 * | 4/2008 | Wang et al. | 375/240.13 |

* cited by examiner

*Primary Examiner* — Anner Holder
(74) *Attorney, Agent, or Firm* — Prakash Nama; Global IP Services, PLLC

(57) ABSTRACT

A system and method for adaptive intra refresh rate setting for each video frame in a video encoder is disclosed. In one embodiment, a video encoding method includes computing channel induced distortion values at multiple intra refresh rates for a coded video frame as a function of channel loss and spatiotemporal content, computing source coding distortion values at the multiple intra refresh rates for the coded video frame as a function of the spatiotemporal content and an operating bit-rate, selecting an intra refresh rate value for one or more video frames subsequent to the encoded video frame as a function of the sum of the corresponding computed channel induced distortion values and the source coding distortion values, and encoding the one or more video frames using the selected intra refresh rate value.

24 Claims, 5 Drawing Sheets

SYSTEM AND METHOD FOR ADAPTIVE INTRA REFRESH RATE SETTING IN A VIDEO ENCODER

FIELD OF TECHNOLOGY

Embodiments of the present invention relate to the field of video encoding. More particularly, embodiments of the present invention relate to a system and method for adaptive intra refresh rate setting in a video encoder.

BACKGROUND

Video Communication over the Internet or wireless networks is prone to severe video quality degradation because of the best effort delivery of user datagram protocol (UDP) packets and the unsuitability of transmission control protocol (TCP) transmission for delay sensitive communication applications. Typical video communication systems use predictive video coders to achieve compression. Because of temporal prediction in these coders, the errors caused due to packet loss in a particular decoded video frame propagate through the motion compensated prediction loop and cause substantial degradation in video quality of even correctly received future video frames. Thus, good video quality of service (QoS) over these networks requires error resilience mechanisms.

Such Low-latency video communication over the Internet requires packet loss resilience in the video coder. Periodic intra-frame coding is not suited in such cases and progressive intra refresh (IR) is commonly employed. Intra update of macroblocks (MBs) provides error resilience (ER) by breaking the prediction dependency chain and controlling error propagation (EP) through the video stream, but leads to a drop in coding efficiency (CE) because of inefficient prediction.

Intra-refresh strategies have to select the MBs to be refreshed in a particular frame with the goal of minimizing the end-to-end distortion. Typically, channel and content adaptive refresh mechanisms are more efficient than methods using random intra update. Many of the state-of-the-art algorithms for error-resilient video coding using rate distortion optimized mode selection techniques have been proposed earlier.

Commonly used methods for providing error resilience in video coders through intra macroblock (MB) update can be broadly classified into two categories. One method being, an error robust rate distortion optimization (ER-RDO) method has been developed in the standard test model, such as H.264, for video coding in packet loss environment. The decoder state is computed as the average over K decoder instances each decoding a statistically packet-loss injected stream. Typically, low-complexity implementations for tracking the decoder channel distortion at the encoder side have been proposed. Main drawback of all these methods using RD-optimized MB mode selection is that they do not allow for any further analysis for frame-level optimization and completely rely on statistically estimated channel distortion to do coding mode selection. Also, the low-latency frame level bits constraint can result in the MB-level rate control skewing the quantizer selection (QP) selection over the frame that can result in sub-optimal refresh and non-uniform spatial quality.

The other method being, explicit intra-refresh based methods are still attractive as they can enable low-complexity implementations and also allow for frame-level optimization. While many methods for selection of refresh MBs have been proposed, the problem of setting the optimal intra-refresh rate in real-time applications has not been addressed comprehensively.

BRIEF DESCRIPTION OF THE DRAWINGS

Embodiments of the present invention are illustrated by way of an example and not limited to the figures of the accompanying drawings, in which like references indicate similar elements and in which.

Other features of the present embodiments will be apparent from the accompanying drawings and from the detailed description that follows.

DETAILED DESCRIPTION

A system and method for adaptive intra refresh rate setting in a video encoder is disclosed. In the following detailed description of the embodiments of the invention, reference is made to the accompanying drawings that form a part hereof, and in which are shown, by way of illustration, specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined by the appended claims.

The term channel induced distortion is used to represent the estimated error, in a predetermined region in the current frame at the receiver side with respect to the encoder side, due to channel loss that propagates from frame to frame due to the motion compensated prediction in the video encoder.

The terms "frame" and "video frame" are used interchangeably throughout the document.

Figure 1:
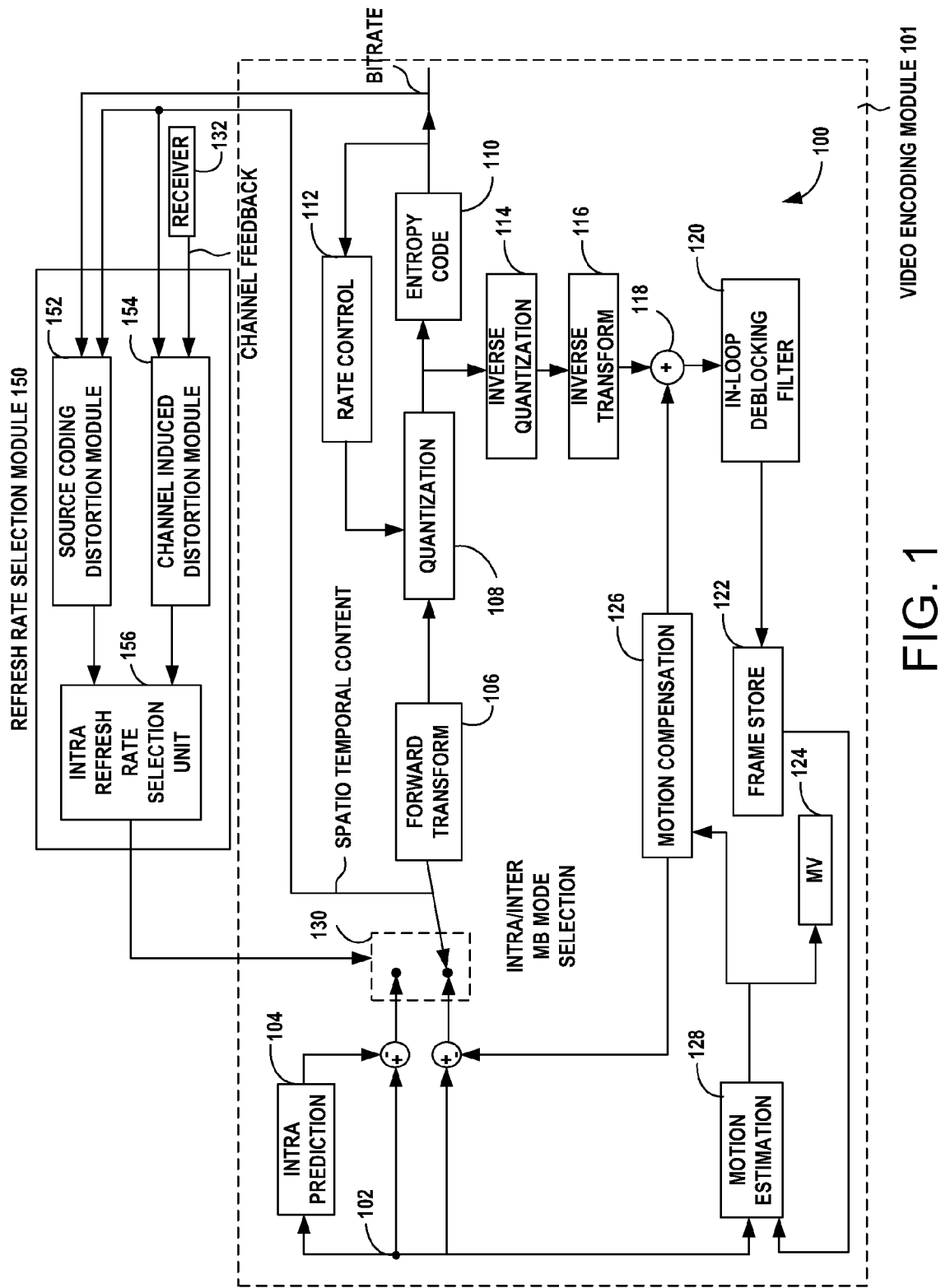
FIG. 1 is a block diagram of a video encoder, according to one embodiment.

The present invention provides a spatiotemporal content, operating bit-rate and channel adaptive intra refresh rate setting for each frame that minimizes the end-to-end distortion. FIG. 1 is a block diagram of a video encoder 100, according to one embodiment. Particularly, the video encoder 100 includes a video encoding module 101 and a refresh rate selection module 150 which are coupled as shown in FIG. 1. The video encoding module 101 receives input video frames 102 and process the video frames 102 through various processing bocks. As illustrated in FIG. 1, the video encoding module 101 includes an intra prediction block 104, forward transform block 106, quantization block 108, inverse quantization block 114, inverse transform block 116, motion compensation block 126, and motion estimation block 128. The video encoding module 101 further includes an adder 118 to receive signals from the blocks 116 and 126 and send an output to the frame store at 122 via an in-loop deblocking filter 120. The motion vector block 124 coupled to the motion compensation block 126 provides a motion vector. Entropy code block 110 provides the output encoded video frame. A feedback is provided to the quantization block 108 via rate control block 112. Further, the Intra/Inter macroblock (MB) mode selection block 130 performs intra vs. inter MB coding mode selection. Additional details about the operation of individual blocks should be intelligible to those skilled in the art.

The subject matter resides in the refresh rate selection module 150. As shown in FIG. 1, the video encoder 100 includes the refresh rate selection module 150 coupled to the video encoding module 101. In one embodiment, the refresh rate selection module 150 includes a source coding distortion module 152 to receive bit consumption information at an operating bit-rate and spatiotemporal content attributes from the video encoding module 101. The source coding distortion module 152 then computes source coding distortion values at multiple intra refresh rates for a coded video frame as a function of the received spatiotemporal content attributes and bit consumption information at the operating bit-rate. In these embodiments, the source coding distortion module 152 models source coding distortion as a function of the spatiotemporal content attributes, the bit consumption information at the operating bit-rate, and an intra refresh rate, and then computes the source coding distortion values at multiple an intra refresh rates using the modeled source coding distortion for the coded video frame. In one example embodiment, the spatiotemporal content attributes include texture, motion and color.

In another embodiment, the refresh rate selection module 150 includes a channel induced distortion module 154 to receive channel loss information from one or more receivers (e.g., the receiver 132) and video frame level error propagation estimates from the video encoding module. The channel induced distortion module 154 then computes channel induced distortion values at multiple intra refresh rates for the coded video frame as a function of the received channel loss information and spatiotemporal content having the video frame level error propagation estimates. In these embodiments, the channel induced distortion module 154 models channel induced distortion as a function of the channel loss information, spatiotemporal content having the video frame level error propagation estimates, and the intra refresh rate, and then computes the channel induced distortion values at multiple intra refresh rates using the modeled channel induced distortion for the coded video frame. In one example embodiment, the channel loss information includes probability of packet loss during video transmission over a predetermined interval.

The refresh rate selection module 150 also includes an intra refresh rate selection unit 156 coupled to the source coding distortion module 152 and the channel induced distortion module 154. The intra refresh rate selection unit 156 selects an intra refresh rate value for one or more video frames subsequent to the encoded video frame as a function of the sum of the corresponding computed channel induced distortion values and the source coding distortion values, wherein the video encoding module encodes the one or more video frames using the selected intra refresh rate value.

Figure 2:
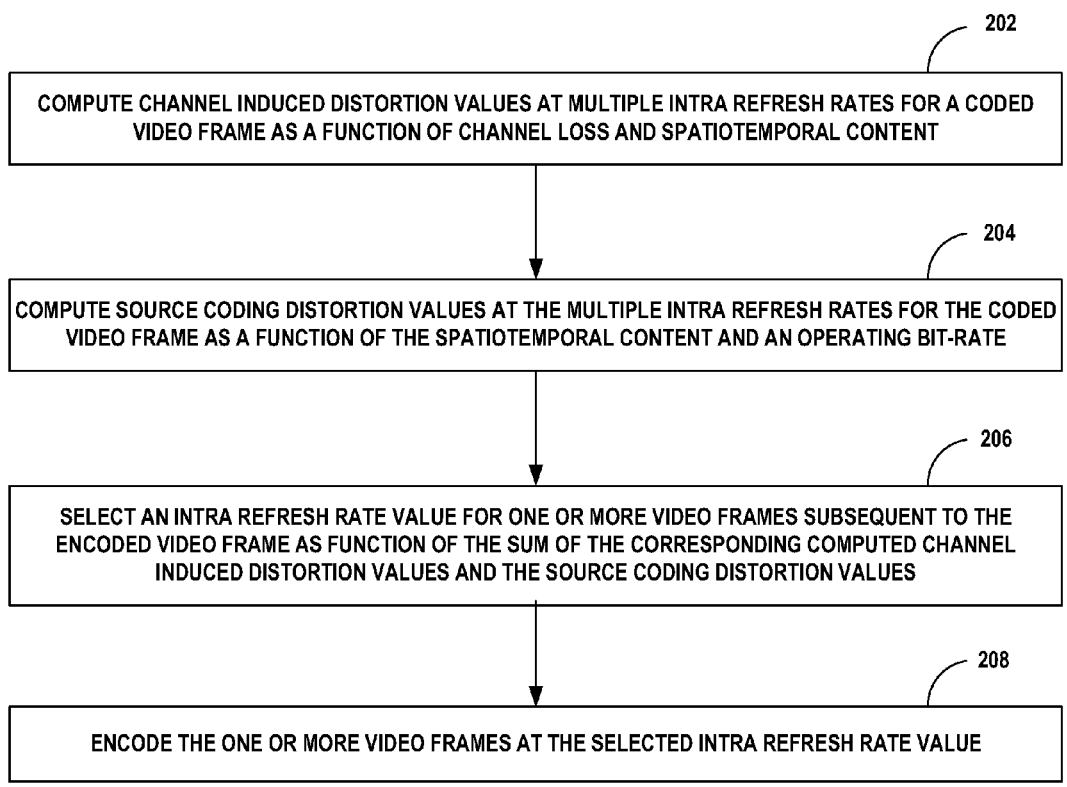
FIG. 2 is a process flow illustrating selection of adaptive intra refresh rate in video encoding, according to one embodiment.

FIG. 2 is a process flow 200 illustrating selection of adaptive intra refresh rate in video encoding, according to one embodiment. In step 202, channel induced distortion values at multiple intra refresh rates are computed for a coded video frame as a function of channel loss and spatiotemporal content. In one example embodiment, the spatiotemporal content includes attributes selected from the group consisting of texture, motion and color, and the channel loss includes probability of packet loss during video transmission over a predetermined interval.

In these embodiments, computing the channel induced distortion values at multiple intra refresh rates for the coded video includes modeling channel induced distortion as a function of the channel loss, spatiotemporal content, and an intra refresh rate, and computing the channel induced distortion values at multiple intra refresh rates using the modeled channel induced distortion for the coded video frame.

In one embodiment, the channel induced distortion is modeled using the equation:

$$A(\beta) = B - C(\beta),$$

where A represents estimated channel induced distortion in a frame when coded with an intra-refreshing rate of $\beta$ refresh macroblocks (MBs)/frame, B represents estimated channel induced distortion in the frame n when no MBs are refreshed, and C represents reduction in the channel induced distortion with $\beta$ refresh MBs.

In one example embodiment, the terms $A(\beta)$, B, and $C(\beta)$ are given by $$A(\beta) = D_{ePest}^{Fr}(n, \beta),\ B = D_{ePest}^{Fr}(n, 0),\ \text{and}\ C(\beta) = (1-p)\sum_{i=1}^{i=\beta} D_{ep\_sorted}^{MB}(i),$$

Where, $D_{ep_{est}}^{Fr}(n, \beta)$ is the estimated channel induced distortion in a frame n when coded with the intra-refreshing rate of $\beta$ refresh MBs/frame, $D_{ep\_sorted}^{MB}(i)$ stands for the $i^{th}$ value in a list of MB-level channel induced distortion estimates when sorted in descending order of their values, where the summation extends over i=1 to $\beta$, $D_{ep\_est}^{Fr}(n, 0)$ is the estimated channel induced distortion in the frame n when no MBs are refreshed, and p is the packet loss probability in the channel.

Therefore, the channel induced distortion is modeled using the above terms as $$D_{ep\_est}^{Fr}(n, \beta) = D_{ep\_est}^{Fr}(n, 0) - (1-p)\sum_{i=1}^{i=\beta} D_{ep\_sorted}^{MB}(i)$$

Further, the channel induced distortion in the frame n when no MBs are refreshed (i.e., $D_{ep\_est}^{Fr}(n, 0)$) is estimated from the aggregate channel induced distortion of the previous frame using the equation:

$$D_{ep\_est}^{Fr}(n,0) = (1-p)bD_{ep}^{Fr}(n-1) + p[D_{ep}^{Fr}(n-1) + D_{ec}^{Fr}(n)]$$

where, $D_{ec}^{Fr}(n)$ is the distortion occurring because of error concealment in the frame n, $D_{ep}^{Fr}(n-1)$ is the estimated channel induced distortion in the frame n−1, and b is a motion randomness factor which indicates the extent of information taken from the previous frame due to motion compensation.

Furthermore, the motion randomness factor (b) is computed using the equation:

$$b = \Sigma D_{ep}^{mc}(n-1, m)/D_{ep}^{Fr}(n-2)$$

where, $D_{ep}^{Fr}(n-2)$ is the estimated channel induced distortion in the frame n−2, and $\Sigma D_{ep}^{mc}(n-1,m)$ is the motion compensated error propagation distortion summed over the pixels in the frame (n−2) to which the m$^{th}$ MB in the frame (n−1) refers to for motion compensated prediction (MCP) and the summation extends over all inter coded MBs in the frame (n−1).

In an alternate embodiment, computing the channel induced distortion values at multiple refresh rates for the coded video frame as a function of channel loss and spatiotemporal content includes computing a channel induced distortion value as an average of the channel induced distortion values estimated over a predetermined window of video frames subsequent to the current video frame. In one example embodiment, the predetermined window of video frames includes multiple video frames taken over a predetermined interval.

In step 204, source coding distortion values at the multiple intra refresh rates are computed for the coded video frame as a function of the spatiotemporal content and the operating bit-rate of the encoder while coding the frame. In these embodiments, computing the source coding distortion values at the multiple intra refresh rates for the coded video frame includes modeling source coding distortion as a function of the spatiotemporal content, operating bit-rate, and intra refresh rate, and computing the source coding distortion values at the multiple intra refresh rates using the modeled source coding distortion for the coded video frame.

In one embodiment, the source coding distortion is modeled using the equation:

$$D_q(\beta) = \sigma^2 e^{-\alpha(R-(\mu_{IR}-\eta)\beta/\theta)}$$

where, $D_q(\beta)$ is the source-coding distortion, $\sigma^2$ is the variance of the inter-coded residuals of the frame, $\alpha$ and $\theta$ are model parameters and are computed using data from the previous frames, R is the total bits allocated for coding the residuals in the frame, $\mu_{IR}$ is an average number of bits required for coding an intra MB computed over a past window of frames, and $\eta$ is an average number of bits required for coding a refresh MB as INTER-MB. In other words, ($\mu_{IR}-\eta$) statistically represents the additional number of bits required for coding a refresh MB.

In an alternate embodiment, computing the source coding distortion values at multiple refresh rates for the coded video frame includes computing an effective intra refresh rate value as a function of selected intra refresh rate values associated with multiple encoded video frames over a predetermined interval, and computing the source coding distortion values as a function of the computed effective intra refresh rate value.

In another example embodiment, computing the source coding distortion values at multiple refresh rates for the coded video frame includes computing an effective intra refresh rate value for each of the frames in a predetermined window of video frames subsequent to the current video frame as a function of selected intra refresh rate values associated with multiple preceding video frames over a predetermined interval, and computing a source coding distortion value as an average of the source coding distortion values estimated for each of the frame in the predetermined window of video frames at their corresponding effective intra refresh rate values.

In step 206, an intra refresh rate value for one or more video frames subsequent to the encoded video frame is selected as a function of the sum of the corresponding computed channel induced distortion values and the source coding distortion values.

In one embodiment, selecting the intra refresh rate value includes summing the corresponding source coding and channel induced distortion values over a range of intra refresh rates from 0 to a number of MBs in the subsequent video frame, and selecting the intra refresh rate value as a function of the summed corresponding source coding and channel induced distortion values.

In another embodiment, selecting the intra refresh rate value includes summing the corresponding source coding and channel induced distortion values over a range of intra refresh rates substantially surrounding the previously computed refresh rate, and selecting the intra refresh rate value as a function of the summed corresponding source coding and channel induced distortion values.

Figure 3:
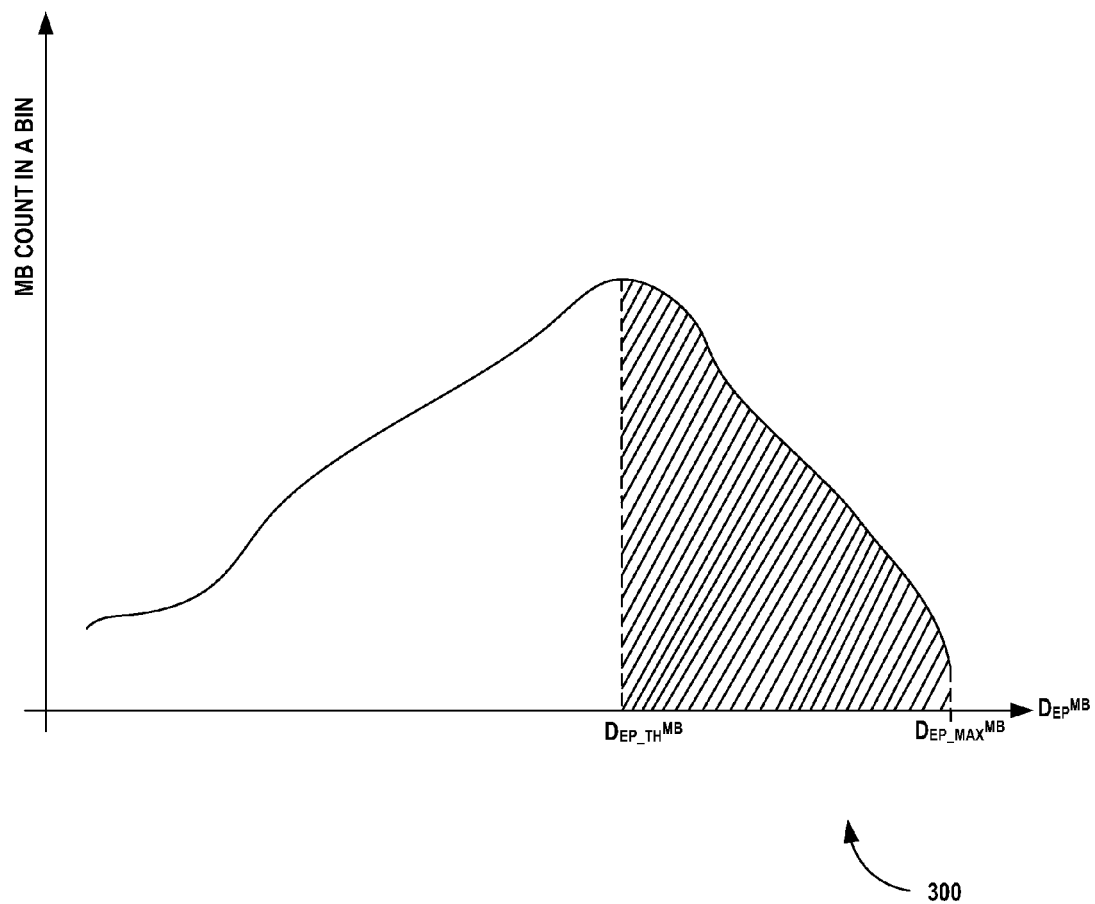
FIG. 3 illustrates a histogram 300 of the number of macroblocks (MBs) having a particular channel induced MB level distortion, in accordance with the principles of the present invention.

In step 208, the one or more video frames are encoded using the selected intra refresh rate value. In one example embodiment, encoding the one or more video frames using the selected intra refresh rate value, includes identifying a MB level channel induced distortion threshold value (e.g., $D_{ep\_th}^{mb}$ as shown in FIG. 3) corresponding to the selected intra fresh rate value in the sorted MB-level channel induced distortion estimates, and encoding a MB as intra if the MB's channel induced distortion estimate exceeds the MB level channel induced distortion threshold value.

In accordance with the above described embodiments with respect to FIG. 1 and FIG. 2, the adaptive intra refresh rate setting mechanism uses frame-level joint source coding and channel induced distortion analysis and adaptively sets an intra-refresh rate for each frame that minimizes end-to-end distortion. For optimal intra-refresh rate selection (RRS) in the video communication, the end-to-end distortion, i.e., the sum of source coding distortion ($D_q$) and channel induced distortion ($D_c$ or $D_{ep}$), has to be minimized under a rate constraint. Further, the end-to-end distortion can have contribution from the cross-correlation between the source coding distortion and the channel induced distortion, which is ignored for mathematical simplicity.

End-to-end distortion minimization essentially deals with optimally trading off coding efficiency (CE) for error resilience (ER). As the intra refresh rate ($\beta$) increases, the end-to-end distortion decreases initially because of the increase in the ER and later increases when the impact of drop in the CE is more than the impact of increase in the ER. The optimal intra refresh rate ($\beta_{opt}$), at which the end-end distortion is minimized, changes as a function of the spatiotemporal content, channel loss rate, and bit-rate.

In one embodiment, the source coding distortion ($D_q(\beta)$) and channel induced distortion ($D_c(\beta)$ or $D_{ep}(\beta)$) are modeled as functions of the intra refresh rate ($\beta$) and the optimal intra refresh rate ($\beta_{opt}$) is chosen to minimize the end-to-end distortion (i.e., ($D_q(\beta)+D_c(\beta)$). In one example embodiment, a block-level channel distortion tracking is employed, and the MBs with the highest channel distortion estimates are selected as refresh MBs. It is appreciated that the above described method for end-to-end distortion estimation accounts for the variable rate of refresh for the video frame. Further, the model for channel induced distortion accounts for the temporal propagation of error in the future frames.

Further, in accordance with the above described embodiments with respect to FIG. 1 and FIG. 2, the channel induced distortion is modeled as a function of channel loss, spatiotemporal content, and intra refresh rate ($\beta$) to compute the optimal intra-refresh rate ($\beta_{opt}$). Further, the channel induced distortion is modeled by computing the total channel induced distortion and then account for the reduction in channel induced distortion because of the refresh of $\beta$ MBs. The estimated channel induced distortion in a frame n when coded with an intra refreshing rate of $\beta$ refresh MBs/frame, $D_{ep\_est}^{Fr}(n, \beta)$, is modeled as $$D_{ep\_est}^{Fr}(n, \beta) = D_{ep\_est}^{Fr}(n, 0) - (1-p)\sum_{i=1}^{i=\beta} D_{ep\_sorted}^{MB}(i)$$

where $D_{ep\_sorted}^{MB}(i)$ represents the $i^{th}$ value in a list of MB-level channel distortion estimates when sorted in descending order of their values, where the summation extends over i=1 to β, $D_{ep\_est}^{Fr}(n, 0)$ is the estimated channel induced distortion in the frame n when no MBs are refreshed, and p is the packet loss probability in the channel. The summation term $\Sigma_{i=1}^{i=\beta} D_{ep\_sorted}^{MB}(i)$ represents the total reduction in channel induced distortion because of refresh of β MBs.

Further, $D_{ep\_est}^{Fr}(n, 0)$ is estimated from the aggregate channel distortion of the previous frame as $$D_{ep_{est}}^{Fr}(n,0) = (1-p)bD_{ep}^{Fr}(n-1) + p[D_{ep}^{Fr}(n-1) + D_{ec}^{Fr}(n)]$$
$$= [(1-p)b + p]D_{ep}^{Fr}(n-1) + [p]D_{ec}^{Fr}(n)$$

where $D_{ec}^{Fr}(n)$ represents the distortion occurring because of error concealment of the frame n, $D_{ep}^{Fr}(n-1)$ is the estimated channel induced distortion in the frame n−1, and b is the motion randomness factor which indicates the extent of motion information taken from the previous frame to estimate $D_{ep}^{Fr}(n)$. In one example embodiment, $D_{ec}^{Fr}(n)$ is computed as the sum of squares of the difference between the corresponding samples in frame n and frame n−1.

The estimated channel induced distortion in the previous frame n−1, i.e., $D_{ep}^{Fr}(n-1)$ is computed at the end of coding the frame as sum of channel induced distortion of all the MBs in the frame given by $$D_{ep}^{Fr}(n-1) = \Sigma D_{ep}^{mb}(n-1)$$

Further, the channel induced distortion of a $m^{th}$ MB in the frame (n−1) is given by $$D_{ep}^{mb}(n-1,m) = p[D_{ep}(n-2,m) + D_{ec}(n-1,m)] + (1-p)D_{ep}^{mc}(n-1,m)$$

where p is the packet loss probability in the channel, $D_{ep}(n-2, m)$ is the channel induced distortion for the $m^{th}$ MB in the frame (n−2) at the co-located position, $D_{ec}(n-1,m)$ is the distortion in the current block because of concealment in case the current block is lost, and $D_{ep}^{mc}(n-1, m)$ is the motion compensated error propagation distortion summed over the pixels in the frame (n−2) to which the $m^{th}$ MB in the frame (n−1) refers to for motion compensated prediction (MCP). Alternatively, the $D_{ep}^{mc}(n-1,m)$ can also be computed from weighted sum of motion compensated block level aggregated distortions instead of pixel level distortions. In one example embodiment, the motion randomness factor (b) is computed as described above.

In another example embodiment, if there is no motion randomness (i.e., b=1), then all the error from frame (n−1) would propagate to frame (n) when no refresh MBs are coded. The estimated channel distortion in the frame n when no MBs are refreshed i.e., $D_{ep\_est}^{Fr}(n, 0)$, with no motion randomness (b=1), can be written as $$D_{ep_{est}}^{Fr}(n,0) = D_{ep}^{Fr}(n-1) + p[D_{ec}^{Fr}(n)]$$

By substituting the $D_{ep_{est}}^{Fr}(n, 0)$ in $D_{ep_{est}}^{Fr}(n, \beta)$ the equation can be obtained as $$D_{ep_{est}}^{Fr}(n, \beta) = [1 - f(\beta)]D_{ep}^{Fr}(n-1) + pD_{ec}^{Fr}(n)$$

$$\text{Where } f(\beta) = \frac{(1-p)\sum_{i=1}^{i=\beta} D_{ep\_sorted}^{MB}(i)}{D_{ep}^{Fr}(n-1)}$$

It can be noted that f(β) stands for the fractional reduction in referenced error propagation because of refreshing β MBs.

In yet another embodiment, the effect of error propagation over the future frames is analyzed as follows. The channel induced distortion is modeled over the next W frames by iteratively projecting the above described model on to the future frames. If n is the current frame, then the channel induced distortion over the future frames ($D_{ep}^{Fr}(n+k, \beta)$) as is modeled as $$D_{ep}^{Fr}(n+k,\beta) = [1-f(\beta)]D_{ep}^{Fr}(n+k-1,\beta) + pD_{ec}^{Fr}(n)$$

The average of the channel distortion estimates over the window of W frames is taken as the average channel distortion estimate, $\overline{D_c(n,\beta)}$. The above mentioned iterative mechanism estimates the channel induced distortions over the future frames if the video signal remains of the same complexity over the window, i.e., it assumes that f(β) and $D_{ec}^{Fr}$ do not change over the frames in the window of analysis. Such an assumption could lead to sub-optimal β in certain frames.

Furthermore, in accordance with above described embodiments with respect to FIG. 1 and FIG. 2, the source coding distortion can be modeled as a function of the spatiotemporal content, an operating bit-rate, and the intra refresh rate (β) as follows. For a given β, the effective source-coding rate ($R_s(\beta)$) is defined as the bit-rate required for coding all MBs as non-refresh MBs with the same amount of source coding distortion ($D_q$) as incurred with β MBs of refresh. The excess bit-rate, which is the additional bit-rate incurred for coding few of the MBs as refresh MBs, is considered as the channel-coding rate ($R_c$). With these definitions, $R_s(\beta)$ could now be modeled using data from the previous frames as:

$$R_s(\beta) = R - R_c(\beta) = R - (\mu_{IR} - \eta)\beta$$

where R represents total number of bits allocated for coding the residuals of the frame, $\mu_{IR}$ represents the average number of bits required for coding an intra MB computed over a past window of frames, and q represents the average number of bits required for coding a refresh MB as an INTER-MB. In other words, ($\mu_{IR}-\eta$) statistically represents the additional number of bits required for coding a refresh MB. For computation of η, all the MBs selected for refresh need to be coded in the INTER path as well. As refresh MBs represent only a fraction of the total number of MBs in the frame, the increase in complexity because of this will be marginal.

In an alternate embodiment, the effective source coding rate is modeled using data from the previous frames as:

$$R_s(\beta) = [(R - \mu_{IR} * \beta)T]/(T - \beta)$$

where T represents the total number of MBs in the current frame. The above expression eliminates the need to code a refresh MB as an inter MB to compute η.

Further, the p-domain model described in the application for patent "Adaptive Intra-refresh for digital video encoding" (i.e., US publication number 2006/0078051) can be written as $$r = \theta(1-\rho)$$

where r is the residual bits required for that particular frame, ρ is the percentage of zeros after quantizing the DCT coefficients, and θ is the model parameter.

The source coding distortion ($D_q(\rho)$) can be modeled as $$D_q(\rho) = \sigma^2 e^{-\alpha(1-\rho)}$$

where $\sigma^2$ is the variance of the current frame's residuals and $\alpha$ is a sequence dependent constant.

For estimating the source coding distortion ($D_q(\beta)$), we can use the all INTER-model, i.e., compute the source-coding distortion if the whole frame is coded with no-refresh MBs with a bit-rate of $R_s(\beta)$. Combining (r) and $D_q(\rho)$ and by using $R_s(\beta)$ as the effective source-coding distortion rate, $D_q(\beta)$ can now be computed as $$D_q(\beta) = \sigma^2 e^{-\alpha(R_s(\beta)/\theta)}$$

where $\sigma^2$ stands for the variance of the inter-residuals of the frame and $\alpha$ and $\theta$ are model parameters computed using data from the previous frames.

In one embodiment, $\alpha$, and $\theta$ are computed as shown below:

$$\alpha = \frac{\ln\left(\frac{D(N-2)}{D(N-1)} * \frac{\sigma^2(N-1)}{\sigma^2(N-2)}\right)}{\rho(N-2) - \rho(N-1)}$$

$$\theta = \frac{R(N-1)}{1 - \rho(N-1)}$$

Where D(j) represents the computed source coding distortion after coding frame j, $\rho(j)$ represents the number of zero coefficients while coding the frame j, $\sigma^2(j)$ represents the residual variance before coding for frame j, R(j) represents for the residual coding bits consumed by frame j, and (N−2) and (N−1) represent the 2 previously coded frames preceding the current frame N.

Furthermore, an intra refresh rate value is selected for one or more video frames subsequent to the encoded video frame as a function of the sum of the corresponding computed channel induced distortion values ($D_{ep\_est}^{Fr}(n, \beta)$) and the source coding distortion values ($D_q(\beta)$). In one example embodiment, the intra refresh rate value is selected for one or more video frames subsequent to the encoded video frame to minimize the end-to-end distortion (i.e., sum of the corresponding computed channel induced distortion values ($D_{ep\_est}^{Fr}(n, \beta)$) and the source coding distortion values ($D_q(\beta)$) at the given operating bit-rate.

In another embodiment, an effective intra refresh rate value $\beta_{\mathit{eff}}$ is computed over a window of previous frames for estimating source coding distortion $D_q$, in the presence of sudden changes in $\beta$. In one example embodiment, the effective intra-refreshing rate $\beta_{\mathit{eff}}$ is computed as an average of intra refresh rates used over the window of previous frames. It can be noted that the quality of the current frame is determined not only by the intra-refresh rate used in this frame but also by the amount of refresh done in the previous set of frames.

In yet another embodiment, the source coding distortion is modeled over the next W frames by iteratively computing $\beta_{\mathit{eff}}$ for each of the frames in the window of W frames as a function of selected intra refresh rate values associated with multiple preceding video frames over a predetermined interval. Then, computing an average source distortion estimate ($\overline{D_q(n,\beta)}$) by averaging the source-coding distortion estimates over the window of W frames at their corresponding effective intra refresh rate values.

After computing the average channel distortion estimate ($\overline{D_c(n,\beta)}$) and average source distortion estimate ($\overline{D_q(n,\beta)}$), the optimal intra-refreshing rate ($\beta_{opt}$) is chosen as the $\beta$ that minimizes the total end-to-end distortion $D(n, \beta)$ over the W frames in the window, where $D(n, \beta)$ is given by $$D(n,\beta) = \overline{D_q(n,\beta)} + \overline{D_c(n,\beta)}$$

It can be noted that the assumptions of stationarity made when projecting the estimated source coding and channel induced distortions may lead to the selection of sub-optimal intra-refresh rate for a particular frame. To avoid this, the size of the window W, is made adaptive to the spatiotemporal content, and is made inversely proportional to the current operating intra-refresh bit-rate, thus W can be interpreted as the effective instantaneous refresh period.

FIG. 3 illustrates a histogram 300 of the number of MBs having a particular channel induced MB level distortion, in accordance with the principles of the present invention. Particularly, FIG. 3 illustrates a plot of channel induced distortion at a MB level and number of MBs in a bin (i.e., range of channel induced distortions at the MB level). As shown in FIG. 3, $D_{ep\_th}^{mb}$ is the channel induced distortion threshold value corresponding to the selected intra fresh rate value in the sorted MB-level channel induced distortion estimates. Further, the shaded area corresponds to the sum of MB-level channel induced distortion estimates when sorted in the descending order of their values up to $\beta$ refresh MBs in the frame, i.e., $$\sum_{i=1}^{i=\beta} D_{ep\_sorted}^{MB}(i).$$

Figure 4:
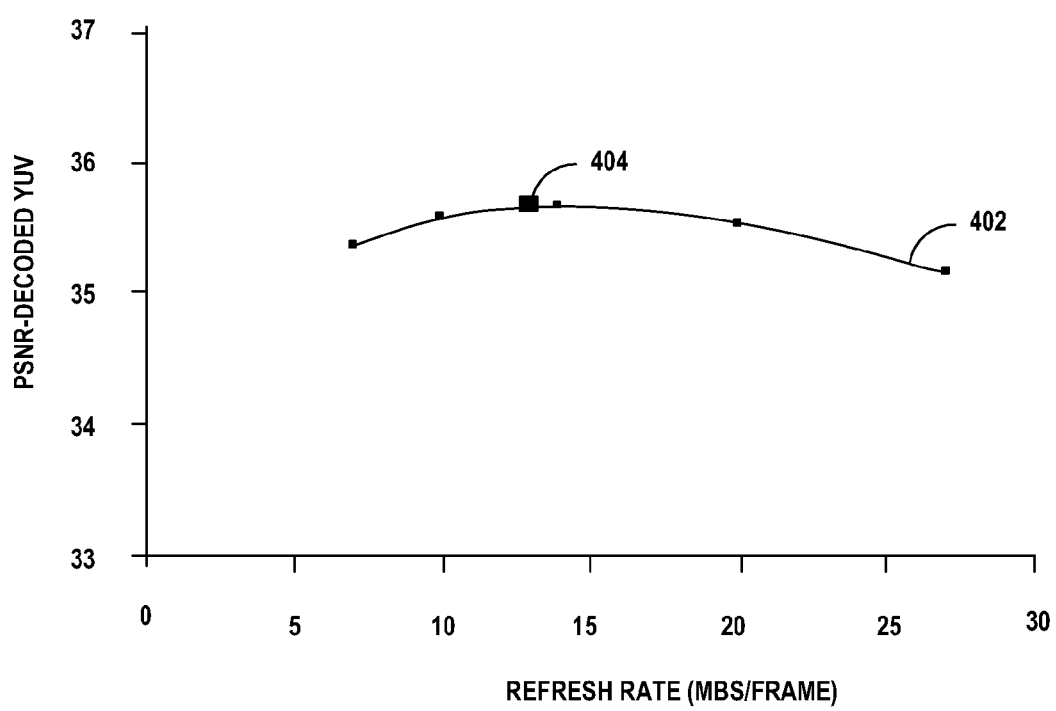
FIG. 4 illustrates a graph 400 illustrating the refresh rate versus peak signal to noise ratio at the decoder side at multiple intra refresh rates, in accordance with the principles of the present invention.

FIG. 4 illustrates a graph 400 illustrating the refresh rate versus peak signal to noise ratio (PSNR) at the decoder side at multiple intra refresh rates, in accordance with the principles of the present invention. The refresh rate selection module selects the best optimal refresh rate based on source coding distortion and channel induced distortion. Further, the refresh rate selection module changes the refresh rate for each video frame. The target for refresh rate selection module is set to match/outperform the peak of the PSNR vs Refresh rate curve generated by using multiple intra refresh rates. Curve 402 shows the performance of a refresh MB selection method for a particular sequence at a particular loss rate and multiple intra refresh rates. It can be observed that the refresh rate selection method reaches the peak PSNR 404 as shown in FIG. 4.

Figure 5:
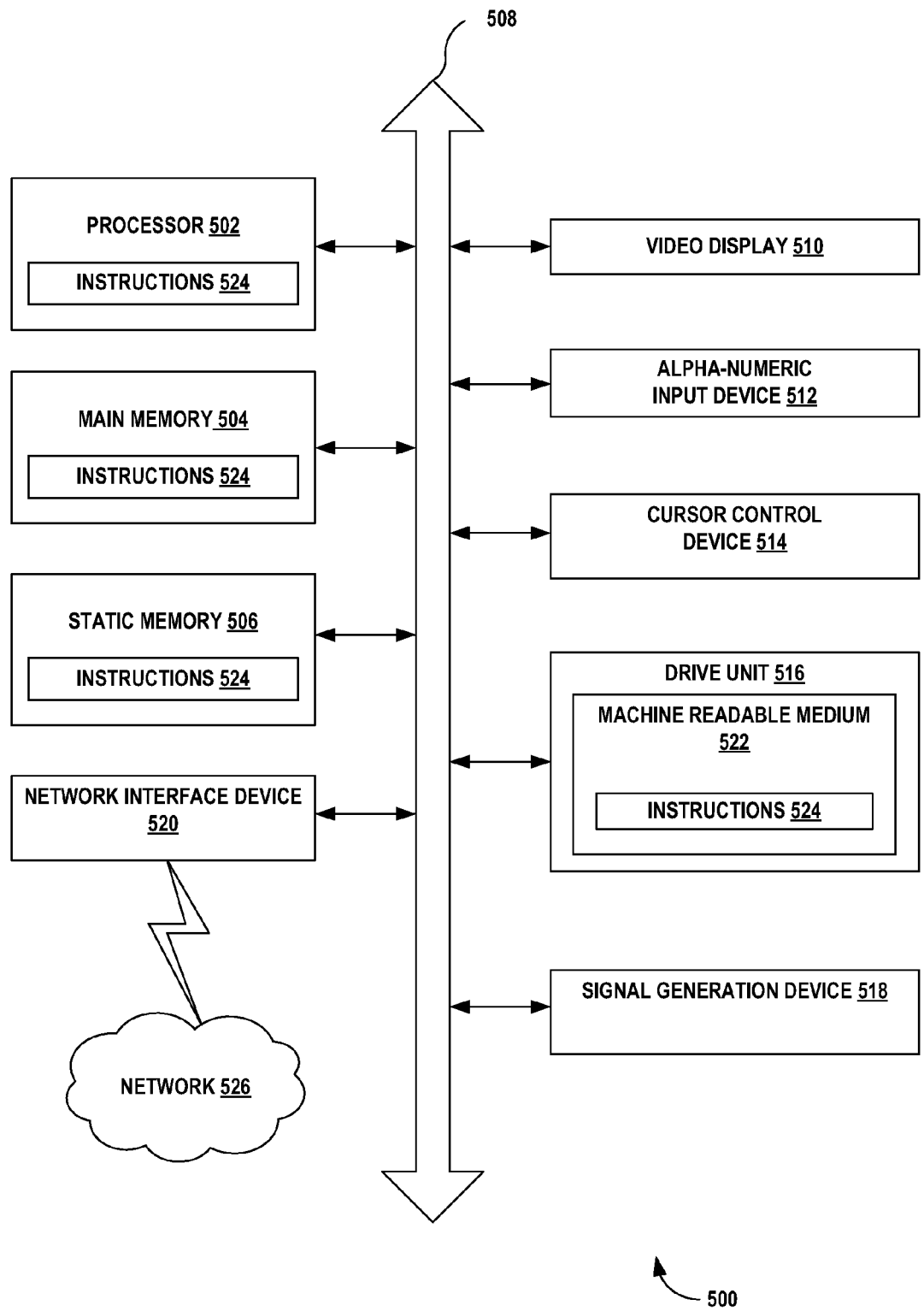
FIG. 5 is a diagrammatic system view of a data processing system in which any of the embodiments disclosed herein may be performed, according to one embodiment.

FIG. 5 is a diagrammatic system view 500 of a data processing system in which any of the embodiments disclosed herein may be performed, according to one embodiment. Particularly, the diagrammatic system view of FIG. 5 illustrates a processor 502, a main memory 504, a static memory 506, a bus 508, a video display 510, an alpha-numeric input device 512, a cursor control device 514, a drive unit 516, a signal generation device 518, a network interface device 520, a machine readable medium 522, instructions 524 and a network 526.

The diagrammatic system view 500 may indicate a personal computer and/or a data processing system in which one or more operations disclosed herein are performed. The processor 502 may be a microprocessor, a state machine, an application specific integrated circuit, a field programmable gate array, etc. The main memory 504 may be a dynamic random access memory and/or a primary memory of a computer system. The static memory 506 may be a hard drive, a flash drive, and/or other memory information associated with the data processing system.

The bus 508 may be an interconnection between various circuits and/or structures of the data processing system. The video display 510 may provide graphical representation of information on the data processing system. The alpha-numeric input device 512 may be a keypad, keyboard and/or any other input device of text (e.g., a special device to aid the physically handicapped). The cursor control device 514 may be a pointing device such as a mouse. The drive unit 516 may be a hard drive, a storage system, and/or other longer term storage subsystem.

The signal generation device 518 may be a BIOS and/or a functional operating system of the data processing system. The network interface device 520 may perform interface functions (e.g., code conversion, protocol conversion, and/or buffering) required for communications to and from the network 526 between a number of independent devices (e.g., of varying protocols). The machine readable medium 522 may provide instructions on which any of the methods disclosed herein may be performed. The instructions 524 may provide source code and/or data code to the processor 502 to enable any one or more operations disclosed herein.

An article comprising a computer readable storage medium having instructions thereon which when executed by a computing platform result in execution of the above mentioned method. The method described in the foregoing may be in a form of a machine-readable medium embodying a set of instructions that, when executed by a machine, causes the machine to perform any method disclosed herein. It will be appreciated that the various embodiments discussed herein may not be the same embodiment, and may be grouped into various other embodiments not explicitly disclosed herein.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A video encoding method, comprising:
    computing channel induced distortion values at multiple intra refresh rates for a coded video frame as a function of channel loss and spatiotemporal content;
    computing source coding distortion values at the multiple intra refresh rates for the coded video frame as a function of the spatiotemporal content and an operating bit-rate;
    selecting an intra refresh rate value for one or more video frames subsequent to the encoded video frame as a function of the sum of the corresponding computed channel induced distortion values and the source coding distortion values; and
    encoding the one or more video frames using the selected intra refresh rate value.

2. The method of claim 1, wherein computing the channel induced distortion values at multiple intra refresh rates for the coded video frame as a function of channel loss and spatiotemporal content, comprises;
    modeling channel induced distortion as a function of the channel loss, spatiotemporal content, and an intra refresh rate; and
    computing the channel induced distortion values at multiple intra refresh rates using the modeled channel induced distortion for the coded video frame.

3. The method of claim 2, wherein the channel induced distortion is modeled using the equation:

$$A(\beta) = B - C(\beta),$$

wherein A represents estimated channel induced distortion in a frame when coded with an intra-refreshing rate of $\beta$ refresh macroblocks (MBs)/frame, B represents estimated channel induced distortion in the frame n when no MBs are refreshed, and C represents reduction in the channel induced distortion with $\beta$ refresh MBs.

4. The method of claim 2, wherein the channel induced distortion is modeled using the equation:

$$D_{ep\_est}^{Fr}(n, \beta) = D_{ep\_est}^{Fr}(n, 0) - (1-p) \sum_{i=1}^{i=\beta} D_{ep\_sorted}^{MB}(i)$$

where, $D_{ep\_est}^{Fr}(n,\beta)$ is the estimated channel induced distortion in a frame n when coded with the intra-refreshing rate of $\beta$ refresh MBs/frame, $D_{ep\_sorted}^{MB}(i)$ is the $i^{th}$ value in a list of MB-level channel induced distortion estimates when sorted in descending order of their values, where the summation extends over i=1 to $\beta$, $D_{ep\_est}^{Fr}(n,0)$ is the estimated channel induced distortion in the frame n when no MBs are refreshed, and p is the packet loss probability in the channel.

5. The method of claim 4, wherein the channel induced distortion in the frame n when no MBs are refreshed, is computed using the equation:

$$D_{ep\_est}^{Fr}(n,0) = (1-p)bD_{ep}^{Fr}(n-1) + p[D_{ep}^{Fr}(n-1) + D_{ec}^{Fr}(n)]$$

where, $D_{ec}^{Fr}(n)$ is the distortion occurring because of error concealment in the frame n, $D_{ep}^{Fr}(n-1)$ is the estimated channel induced distortion in the frame n−1, and b is a motion randomness factor which indicates the extent of information taken from the previous frame due to motion compensation and is computed using the equation:

$$b = \Sigma D_{ep}^{mc}(n-1,m)/D_{ep}^{fr}(n-2)$$

where, $D_{ep}^{Fr}(n-2)$ is the estimated channel induced distortion in the frame n−2, and $\Sigma D_{ep}^{mc}(n-1,m)$ is the motion compensated error propagation distortion summed over the pixels in the frame (n−2) to which the $m^{th}$ MB in the frame (n−1) refers to for motion compensated prediction (MCP) and the summation extends over all inter coded MBs in the frame (n−1).

6. The method of claim 4, wherein encoding the one or more video frames using the selected intra refresh rate value, comprises:
    identifying a MB level channel induced distortion threshold value corresponding to the selected intra fresh rate value in the sorted MB-level channel induced distortion estimates; and
    encoding a MB as intra if the MB's channel induced distortion estimate exceeds the MB level channel induced distortion threshold value.

7. The method of claim 1, wherein computing the source coding distortion values at multiple intra refresh rates for the coded video frame as a function of spatiotemporal content and operating bit-rate, comprises:
    modeling source coding distortion as a function of the spatiotemporal content, operating bit-rate, and an intra refresh rate; and
    computing the source coding distortion values at multiple intra refresh rates using the modeled source coding distortion for the coded video frame.

8. The method of claim 7, wherein the source coding distortion is modeled using the equation:

$$D_q(\beta) = \sigma^2 e^{-\alpha(R-(\mu_{IR}-\eta)\beta/\theta)}$$

where, $D_q(\beta)$ is the source-coding distortion, $\sigma^2$ is the variance of the inter-coded residuals of the frame, $\alpha$ and $\theta$ are model parameters and are computed using data from the previous frames, R is the total bits allocated for coding the residuals in the frame, $\mu_{IR}$ is an average number of bits required for coding an intra MB computed over a past window of frames, and $\eta$ is an average number of bits required for coding a refresh MB as INTER-MB.

9. The method of claim 1, wherein selecting the intra refresh rate value comprises:
summing the corresponding source coding and channel induced distortion values over a range of intra refresh rates from 0 to a number of macroblocks in the subsequent video frame; and
selecting the intra refresh rate value as a function of the summed corresponding source coding and channel induced distortion values.

10. The method of claim 1, wherein selecting the intra refresh rate value comprises:
summing the corresponding source coding and channel induced distortion values over a range of intra refresh rates substantially surrounding the previously computed refresh rate; and
selecting the intra refresh rate value as a function of the summed corresponding source coding and channel induced distortion values.

11. The method of claim 1, wherein the spatiotemporal content comprises attributes selected from the group consisting of texture, motion and color.

12. The method of claim 1, wherein the channel loss comprises probability of packet loss during video transmission over a predetermined interval.

13. The method of claim 1, wherein computing the channel induced distortion values at multiple refresh rates for the coded video frame as a function of channel loss and spatiotemporal content, comprises:
computing a channel induced distortion value as an average of the channel induced distortion values estimated over a predetermined window of video frames subsequent to the current video frame.

14. The method of claim 1, wherein computing the source coding distortion values at multiple refresh rates for the coded video frame as a function of spatiotemporal content and operating bit-rate comprises:
computing an effective intra refresh rate value as a function of selected intra refresh rate values associated with multiple encoded video frames over a predetermined interval; and
computing the source coding distortion values as a function of the computed effective intra refresh rate value.

15. The method of claim 1, wherein computing the source coding distortion values at multiple refresh rates for the coded video frame as a function of bit-rate and spatiotemporal content, comprises:
computing an effective intra refresh rate value for each of the frames in a predetermined window of video frames subsequent to the current video frame as a function of selected intra refresh rate values associated with multiple preceding video frames over a predetermined interval; and
computing a source coding distortion value as an average of the source coding distortion values estimated for each of the frames in the predetermined window of video frames at their corresponding effective intra refresh rate values.

16. An article comprising a non-transitory computer readable storage medium having instructions thereon which when executed by a computing platform result in execution of a video encoding method, comprising:
computing channel induced distortion values at multiple intra refresh rates for a coded video frame as a function of channel loss and spatiotemporal content;
computing source coding distortion values at the multiple intra refresh rates for the coded video frame as a function of the spatiotemporal content and an operating bit-rate;
selecting an intra refresh rate value for one or more video frames subsequent to the encoded video frame as a function of the sum of the corresponding computed channel induced distortion values and the source coding distortion values; and
encoding the one or more video frames using the selected intra refresh rate value.

17. The article of claim 16, wherein computing the channel induced distortion values at multiple intra refresh rates for the coded video frame as a function of channel loss and spatiotemporal content, comprises:
modeling channel induced distortion as a function of the channel loss, spatiotemporal content, and an intra refresh rate; and
computing the channel induced distortion values at multiple intra refresh rates using the modeled channel induced distortion for the coded video frame.

18. The article of claim 16, wherein computing the source coding distortion values at intra multiple refresh rates for the coded video frame as a function of spatiotemporal content and operating bit-rate, comprises:
modeling source coding distortion as a function of the spatiotemporal content, operating bit-rate, and an intra refresh rate; and
computing the source coding distortion values at multiple intra refresh rates using the modeled source coding distortion for the coded video frame.

19. The article of claim 16, wherein computing the channel induced distortion values at multiple refresh rates for a coded video frame as a function of channel loss and spatiotemporal content, comprises:
computing channel induced distortion value as an average of the channel induced distortion values estimated over a predetermined window of video frames subsequent to the current video frame.

20. The article of claim 16, wherein computing the source coding distortion values at multiple refresh rates for the coded video frame as a function of spatiotemporal content and operating bit-rate comprises:
computing an effective intra refresh rate value as a function of selected intra refresh values associated with multiple encoded video frames over a predetermined interval; and
computing the source coding distortion values as a function of the computed effective intra refresh rate value.

21. The article of claim 16, wherein computing the source coding distortion values at multiple refresh rates for the coded video frame as a function of bit-rate and spatiotemporal content, comprises:
computing an effective intra refresh rate value for each of the frame in a predetermined window of video frames subsequent to a current video frame as a function of selected intra refresh values associated with multiple preceding video frames over a predetermined interval; and computing a source coding distortion value as an average of the source coding distortion values estimated for each of the frames in the predetermined window of video frames at their corresponding effective intra refresh rate values.

22. A video encoder, comprising:

a video encoding module; and a refresh rate selection module coupled to the video encoding module, wherein the refresh rate selection module comprises:

a source coding distortion module to receive bit consumption information at an operating bit-rate and spatiotemporal content attributes from the video encoding module and compute source coding distortion values at multiple intra refresh rates for a coded video frame as a function of the received spatiotemporal content attributes and bit consumption information at the operating bit-rate;

a channel induced distortion module to receive channel loss information from one or more receivers and video frame level error propagation estimates from the video encoding module and compute channel induced distortion values at multiple intra refresh rates for the coded video frame as a function of the received channel loss information and spatiotemporal content having the video frame level error propagation estimates; and an intra refresh rate selection unit to select an intra refresh rate value for one or more video frames subsequent to the encoded video frame as a function of the sum of the corresponding computed channel induced distortion values and the source coding distortion values, wherein the video encoding module encodes the one or more video frames using the selected intra refresh rate value.

23. The video encoder of claim 22, wherein the source coding distortion module to model source coding distortion as a function of the spatiotemporal content attributes, the bit consumption information at the operating bit-rate, and an intra refresh rate, and compute the source coding distortion values at multiple intra refresh rates using the modeled source coding distortion for the coded video frame.

24. The video encoder of claim 22, wherein the channel induced distortion module to model channel induced distortion as a function of the channel loss information, spatiotemporal content having the video frame level error propagation estimates, and an intra refresh rate, and compute the channel induced distortion values at multiple intra refresh rates using the modeled channel induced distortion for the coded video frame.

* * * * *